(12) United States Patent
Arens (10) Patent No.: US 11,181,040 B2
(45) Date of Patent: Nov. 23, 2021

(54) CONTROL DEVICE FOR A VCR CONNECTING ROD FOR DETERMINING A DEFECT

(71) Applicants: IWIS MOTORSYSTEME GMBH & CO. KG, Munich (DE); AVL LIST GMBH, Graz (AT)

(72) Inventor: Kai Arens, Munich (DE)

(73) Assignees: IWIS MOTORSYSTEME GMBH & CO. KG, Munich (DE); AVL LIST GMBH, Graz (AT)

( * ) Notice: Subject to any disclaimer, the term of this patent is extended or adjusted under 35 U.S.C. 154(b) by 98 days.

(21) Appl. No.: 16/604,515

(22) PCT Filed: Apr. 10, 2018

(86) PCT No.: PCT/EP2018/000187
§ 371 (c)(1),
(2) Date: Oct. 10, 2019

(87) PCT Pub. No.: WO2018/188794
PCT Pub. Date: Oct. 18, 2018

(65) Prior Publication Data
US 2020/0149468 A1    May 14, 2020

(30) Foreign Application Priority Data

Apr. 10, 2017  (DE) .......................... 102017107717.0
May 2, 2017   (DE) .......................... 102017109358.3

(51) Int. Cl.
*F02B 75/04*    (2006.01)
*F02D 41/04*    (2006.01)
(Continued)

(52) U.S. Cl.
CPC ............ *F02B 75/045* (2013.01); *F02D 35/02* (2013.01); *F02D 41/04* (2013.01); *F02D 41/20* (2013.01); *F02D 41/221* (2013.01)

(58) Field of Classification Search
CPC ...... F02B 75/045; F02D 15/02; F02D 41/221; F02D 2041/227; F16C 7/06
See application file for complete search history.

(56) References Cited

U.S. PATENT DOCUMENTS 2,873,728 A * 2/1959 Biermann ............... F02D 15/02
                                                        123/48 B
4,834,031 A * 5/1989 Katoh ..................... F02B 75/04
                                                        123/48 R
(Continued)

FOREIGN PATENT DOCUMENTS

AT         15006 U2 * 10/2016  ............ F02B 75/045
DE       3 825 369 C1    5/1989
(Continued)

OTHER PUBLICATIONS

DE-102013210494-A1 English machine translation provided by ip.com (Year: 2021).*
(Continued)

*Primary Examiner* — Michael A Kessler
(74) *Attorney, Agent, or Firm* — BakerHostetler (57) ABSTRACT

A control device for a VCR connecting rod which can be operated by way of an actuation circuit is provided. Such a VCR connecting rod is to enable safe operation. For this purpose, a detection device is provided for determining a defect of the actuation circuit. Furthermore, the invention relates to a respectively associated method for operating an actuation circuit of a VCR connecting rod of an internal combustion engine.

6 Claims, 4 Drawing Sheets

(51) Int. Cl.
*F02D 35/02* (2006.01)
*F02D 41/20* (2006.01)
*F02D 41/22* (2006.01)

(56) References Cited

U.S. PATENT DOCUMENTS

| | | | |
|---|---|---|---|
| 2003/0074956 A1 | 4/2003 | Cullen | |
| 2003/0177987 A1* | 9/2003 | Boyer | F02D 41/221 123/78 E |
| 2010/0294244 A1* | 11/2010 | Favennec | F02D 15/02 123/48 R |
| 2011/0226220 A1* | 9/2011 | Wilkins | F16J 7/00 123/48 B |
| 2015/0075497 A1* | 3/2015 | Hutzelmann | F02B 75/044 123/48 A |
| 2015/0260094 A1* | 9/2015 | Wittek | F02B 75/045 123/48 B |
| 2017/0022895 A1* | 1/2017 | Balling | F16K 27/041 |
| 2018/0052077 A1* | 2/2018 | Adachi | F02D 41/1497 |

FOREIGN PATENT DOCUMENTS

| | | | | |
|---|---|---|---|---|
| DE | 10 247 942 A1 | 5/2003 | | |
| DE | 10 2010 032 487 A1 | 2/2012 | | |
| DE | 10 2012 020 999 A1 | 1/2014 | | |
| DE | 102013210494 A1 * | 12/2014 | | F02D 15/02 |
| EP | 1 348 852 A2 | 10/2003 | | |
| WO | 2015/055582 A2 | 4/2015 | | |
| WO | WO-2016203047 A1 * | 12/2016 | | F16K 11/048 |

OTHER PUBLICATIONS

DE 102010032487 A1 English machine translation of description provided by ESPACENET (Year: 2020).*

* cited by examiner

| RLV/RSV | defect (passage flow) | safe position |
|---|---|---|
| RLV 1 (35.1) | none | long |
| | uncontrolled | short |
| RSV 1 (30.1) | none | short |
| | uncontrolled | long |
| RLV 2 (36.1) | none | short |
| | uncontrolled | long |
| RSV 2 (32.1) | none | long |
| | uncontrolled | short |

Fig. 4

| | defect (passage flow) | RLV 1 (35.1) | | |
|---|---|---|---|---|
| | | OK | none | uncontrolled |
| RLV 1 (35.1) | OK | | | |
| | none | | | |
| | uncontrolled | | | |
| RSV 1 (30.1) | OK | | long | short |
| | none | short | intermediate switch position short | short |
| | uncontrolled | short | short | short |
| RLV 2 (36.1) | OK | | long | short |
| | none | short | cannot be influenced | short |
| | uncontrolled | long | long | cannot be influenced |
| RSV 2 (32.1) | OK | | long | short |
| | none | long | long | cannot be influenced |
| | uncontrolled | long | long | cannot be influenced |

Fig. 5

CONTROL DEVICE FOR A VCR CONNECTING ROD FOR DETERMINING A DEFECT

CROSS-REFERENCE TO RELATED APPLICATIONS

This application is a National Stage of International patent application PCT/EP2018/000187, filed on Apr. 10, 2018, which claims priority to foreign German patent application No. DE 102017107717.0, filed on Apr. 10, 2017, and German patent application No. DE 102017109358.3, filed May 2, 2017, the disclosures of which are incorporated by reference in their entireties.

FIELD OF THE INVENTION

The present invention relates to a control device for a VCR connecting rod which can be operated by way of a preferably hydraulic actuation circuit.

BACKGROUND

Such a VCR (variable compression ratio) connecting rod is known, for example, from WO2015/05558282 A2. The thermal degree of efficiency $h_{th}$ of spark ignition engines is dependent on the compression ratio $\varepsilon$, i.e. the ratio of the total volume prior to the compression to the compression volume ($\varepsilon$=displacement $V_h$+compression volume $V_c$)/compression volume $V_c$). As the compression ratio increases, the thermal degree of efficiency also increases. The increase in the thermal degree of efficiency over the compression ratio is degressive, but still relatively pronounced in the range of values that are typical nowadays ($\varepsilon$=10-14).

In practice, the compression ratio cannot be increased arbitrarily. For example, too high a compression ratio in spark ignition engines leads to knocking. In this case, the mixture is ignited by the increase in pressure and temperature during compression and not by the spark. This premature combustion not only leads to an uneven run, but can cause component damage.

The compression ratio from which knocking occurs depends, among other things, on the operating point (rotational speed n, temperature T, throttle position, etc.) of the engine. Higher compression is possible in the partial load range. Therefore, it is endeavored to adjust the compression ratio to the respective operating point. There are various approaches to this. According to WO 2015/055582 A2 mentioned above, the compression ratio is to be adjusted by way of the connecting rod length. The connecting rod length influences the compression volume. The displacement is determined by the position of the crankshaft journal and the cylinder bore. A short connecting rod therefore leads to a smaller compression ratio than a long connecting rod with otherwise identical geometric dimensions (crankshaft, cylinder head, valve timing, etc.) In the known device, the connecting rod length is hydraulically varied between two positions. The entire connecting rod is configured to be multi-part, where the change in length is effected by a telescopic mechanism. The connecting rod comprises a double-action hydraulic cylinder. The connecting rod small end (piston pin) is connected to a piston rod (telescopic rod member). The piston is guided in an axially slideable manner in a cylinder which is arranged in the connecting rod member with the connecting rod large end (crankshaft journal). The piston separates the cylinder into two chambers (upper and lower pressure chamber). These two chambers are supplied with engine oil via check valves (RSV1 and RSV2). If the connecting rod is disposed in the long position, there is no oil present in the upper pressure chamber. The lower pressure chamber, on the other hand, is completely filled with oil. During operation, the connecting rod is subjected to alternating pull and push forces due to the gas and mass forces. In the long position of the connecting rod, a pull force is absorbed by mechanical contact with an upper stop of the piston. As a result, the connecting rod length does not change. A push force applied is transmitted via the piston surface to the lower chamber filled with oil. Since the check valve of this chamber prevents oil from returning, the oil pressure increases. The connecting rod length does not change. The connecting rod is hydraulically locked in this direction.

The situation is reversed in the short position. The lower chamber is empty, the upper chamber is filled with oil. A pull force causes a pressure increase in the upper chamber. A push force is absorbed by a mechanical stop.

The connecting rod length can be adjusted in two steps in that one of the two chambers is emptied. One of the two inlet check valves (RSV1 and RSV2) is there bridged by an associated return flow channel (RL1 and RL2). Engine oil can flow through this return flow channel independently of the pressure difference between the pressure chamber and the supply device. The respective check valve therefore loses its effect.

The two return flow channels are opened and closed by a control valve, where precisely one return flow channel is always open, and the other is closed. The actuator for switching the two return flow channels is controlled hydraulically by the supply pressure.

The oil supply is provided by the lubrication of the connecting rod bearing. For this purpose, an oil passage is required from the crankshaft journal via the connecting rod bearing to the connecting rod.

Switching is effected by selectively emptying of one of the two pressure chambers by making use of the mass and gas forces acting on the connecting rod, where the respective other pressure chamber is supplied with oil by an inlet check valve and is hydraulically blocked.

However, the compression ratio should be significantly increased only in partial or low load operation, respectively, for which reason it is important that a hydraulic actuation circuit of the VCR connecting rod operate with the necessary reliability.

SUMMARY OF THE INVENTION

It is therefore the object of the present invention to provide a control device of the type mentioned above which provides sufficient reliability to prevent engine damage.

This object is satisfied according to the invention in a control device of the type mentioned above in that a detection device for determining a defect of the actuation circuit is provided.

The invention is advantageously used in a control device for a VCR connecting rod with an operating device which can be operated by way of a preferably hydraulic actuation circuit.

The detection of such a defect can subsequently be used to take various measures to prevent engine damage and, possibly, to allow continued non-critical operation. Whenever the VCR connecting rod does not move to the desired target position by way of the actuation circuit or is possibly unstable, this can be determined depending on the type of configuration of the detection device. The actuation circuit is preferably configured as a hydraulic actuation circuit; however, it can also be a mechanical actuation circuit. The actuation circuit preferably only comprises the components that are responsible for the respective signal or energy flow (e.g. hydraulic flow) and not the components executing the adjustment stroke (e.g. upper and lower connecting rod member with the piston and the cylinder or eccentric connecting rod end). These components executing the adjustment stroke are preferably allocated to the operating mechanism activated by the actuation circuit.

According to one embodiment, the detection device preferably comprises a distinguishing device for identifying the defective component of the actuation circuit. These components can be, for example, return flow valves, check valves, control lines, control valves, simply all components that act directly in or on the actuation circuit. This means all components that actively participate in the energy flow, in particular the hydraulic flow, of the actuation circuit. The distinguishing device and therefore the exact identification of the defect therefore provides the possibility to initiate selected measures that cope with exactly this defect and represent the best possible solution for the defect situation.

For this purpose, a fault management device can be provided in a further variant and configured in such a way that it outputs at least one predetermined control signal for effecting a predetermined switching position of the actuation circuit, after the detection device has determined a defect in dependence of a fault routine stored in a storage device. The fault management device therefore causes a predetermined actuation behavior of the actuation circuit, in particular, measures are initiated to prevent engine damage.

In the worst case, the respective cylinder or internal combustion engine is shut down. Limiting the performance of this cylinder or internal combustion engine is a possibly acceptable alternative. Such a safety system therefore increases the safety of the vehicle and the occupants (e.g. upon breakdown). If, for example, the compression ratio in the cylinder is too large, for example, a risk of damage arises due to an unstable position of the connecting rod (knocking). In addition to the negative acoustic effect, knocking can also lead to a defect in the internal combustion engine. In particular, if the defect is clearly identified in advance, the countermeasures to be taken can also be adapted precisely to this identified defect.

For this purpose, it can be provided according to one further embodiment that the fault management device is configured in such a way that it outputs at least one predetermined control signal for assuming a switching position of the actuation circuit associated with the identified defective component or component in dependence of the identified defective component or components and in dependence of a fault routine stored in a storage device. Precise identification of the defective component or components allows for appropriate necessary countermeasures to be taken, including shutdown of the cylinder or the internal combustion engine, respectively. Alternatively or additionally, the VCR connecting rod can also be moved to a stable position in which it can at least in part maintain its operation (possibly with reduced performance or poorer exhaust emissions values).

Advantageously, the detection device can comprise a sensor device for determining the actual position of the VCR connecting rod and/or a sensor device for determining the actual state of a component or the components of the actuation circuit. A sensor that is often already present in respective internal combustion engines is the knock sensor which can be used, for example, to determine the actual position of the VCR connecting rod. However, distance or other status sensors can also be used to determine the operating status of the actuation circuit and/or of the components that provide an immediate indication of the actual position of the VCR connecting rod or the state of the respective component monitored. For this purpose, status sensors which operate autonomously are particularly suitable since they are preferably housed in a fast moving system and they can be supplied with energy from the outside only with difficulty or whose data is to be queried.

Additionally or alternatively, a storage device with a status protocol stored for the switching position of the actuation circuit to be assumed in dependence of the engine performance data can be provided according to a further embodiment, where an evaluation device is provided which determines the target position of the VCR connecting rod and/or the target state of a component or of components of the actuation circuit on the basis of determined engine performance data and a comparison to the status protocol. In modern internal combustion engines, there is typically an engine control system (or control devices) present that already determines and makes suitable engine data available. This can be, for example, the rotational speed, the torque, optionally further parameters of the internal combustion engine which provide indications of the concrete target position of the VCR connecting rod or the actuation circuit, respectively. Data related to the oil circuit, in particular the oil pump, can also be used, provided that sufficient indications can be obtained about the target position of the VCR connecting rod and the actuation circuit.

In a particularly simple version, it is provided that a hydraulic actuation circuit comprises a control valve and that the distinguishing device is configured in such a way that, once a defect has been determined, it generates a signal for changing the switching position of the control valve to identify the defective component of the actuation circuit The switch-over process or the change of the switching position and the normally associated change of state can cause the defect arisen to be identified, or possibly narrowed down. If necessary, repeatedly switching back and forth is also done in order to identify the concrete defect or the defective position accordingly following the exclusion principle of narrowing down.

Furthermore, the invention relates to a method for operating an actuation circuit of a VCR connecting rod (or an operating mechanism of a VCR connecting rod) of an internal combustion engine. The method comprises the steps of:
  determining a defect of the actuation circuit by use of a detection device and generating a predetermined control signal for the defect-dependent actuation of the actuation circuit or shutdown of the internal combustion engine and/or for generating a defect display signal in order to effect an optical and/or acoustic fault display.

Defect-dependent actuation only makes sense, of course, if various defects can occur which require the adapted actuation of the actuation circuit. In addition or alternatively, a fault message is sent to the driver of a vehicle who can optionally receive instructions for action (e.g. to consult a workshop, immediately shut down the vehicle).

The target position of the VCR connecting rod can advantageously be determined by a comparison of status data of the VCR connecting rod determined and/or of the internal combustion engine to correspondingly stored status data, where the actual position of the VCR connecting rod is determined directly and/or indirectly and a defect can be identified by comparing the target position to the actual position. For example, corresponding status data or target data, respectively, can be stored in an engine control system and indicate the required target position of the VCR connecting rod. This is in differentiation to the actual position of the VCR connecting rod actually determined. This actual position can be determined, for example, by a knock sensor, a distance sensor or also indirectly by way of status sensors within the actuation circuit or on the basis of engine data, optionally including the data of the oil pump. Based on a comparison of the target position to the actual position, it can then be determined whether the VCR connecting rod is operating as desired or whether a fault, i.e. a defect is given.

The status data of the VCR connecting rod determined for determining the target position can possibly comprise the oil pressure at the connecting rod bearing and/or the state of actuation of the associated oil pump and/or the determined status data of the combustion engine, the rotational speed and/or the torque. Based on the rotational speed and/or the torque, the load state of the combustion engine can be determined and a conclusion about the respective compression ratio, i.e. the target position of the VCR connecting rod, can be drawn. Similarly, the target position of the VCR connecting rod can be inferred based on the oil pressure or the state of actuation of the associated oil pump. A comparison to stored data is generally required.

For determining the actual position of the VCR connecting rod, an existing sensor device on the internal combustion engine, in particular a knock sensor, and/or a sensor device on the VCR connecting rod can advantageously be used. Especially the use of the knock sensor requires no large modification for conventional internal combustion engines, since this knock sensor is typically already present and only needs to be employed to determine the actual position of the VCR connecting rod. The actual position can usually be determined by a correspondingly adapted evaluation routine. Alternatively or additionally, sensor devices or components of sensor devices, by use of which the actual position can be determined, can also be present on the VCR connecting rod itself.

To determine the actual position of the VCR connecting rod, the performance data of the internal combustion engine can be evaluated, where the performance data used allows for conclusions about the actual position.

Furthermore, after determining predetermined defects by operating the actuation circuit, the VCR connecting rod can be moved to a stable position, where the short position of the VCR connecting rod is preferably given precedence depending on the defect. In the short position of the VCR connecting rod, the disadvantage lies mainly in possibly deteriorating exhaust emissions values, where a trip with the vehicle, e.g. to a workshop is still possible. The short position certainly prevents irreversible damage to the internal combustion engine.

In contrast, if the VCR connecting rod is moved to a stable position corresponding to the long position of the VCR connecting rod, then the available performance of the internal combustion engine can be lowered to a predetermined lower level, depending on the defect. This prevents knocking from occurring in the long position, which could lead to damage to the internal combustion engine. The reduction in performance takes this into account; however, a trip to the nearest workshop is still possible even with this reduced performance.

According to one further method variant in which the actuation circuit comprises a control valve, the defective component or the defective components of the actuation circuit is/are determined by switching the control valve. When switching the control valve, a distinction can be made between a stable and an unstable position. In addition, conclusions then arise as to which component is defective, since a certain state can no longer be obtained in a stable manner. The defect can thus be narrowed down. Other elements of the actuation circuit can also be switched for this purpose to determine a defect.

In addition, it can be provided that the actuation circuit comprises a first return flow valve (RLV1), a first check valve (RSV1), a second return flow valve (RLV2), and a second check valve (RSV2) as components, where the actuation circuit upon detection of a defect of one of these components can move the VCR connecting rod to a stable position (safe position) according to the following fault routine:

| RLV/RSV | defect (passage flow) | safe position |
|---|---|---|
| RLV1 | none | long |
|  | uncontrolled | short |
|  | none | short |
|  | uncontrolled | long |
| RSV1 |  |  |
| RLV 2 | none | short |
|  | uncontrolled | long |
| RSV 2 | none | long |
|  | uncontrolled | short |

In the event of a defect, meaning, for example, that no passage flow is given at all through the valve, or that it occurs uncontrollably (i.e. independent of the specific switching position or due to leakage), a predetermined position of the VCR connecting rod is assumed. A predetermined fault routine can also be installed for the defect of several of these components. If a stable position can no longer be obtained, then the respective cylinder or the internal combustion engine is shut down.

The position of the VCR connecting rod is generally adjusted in dependence of the rotational speed and load torque of the internal combustion engine. In the simplest case, the same position is specified for the VCR connecting rods at the same time in all cylinders. However, switching strategies, according to which the VCR connecting rod sets a proprietary compression ratio for each individual cylinder, are also conceivable. Accordingly, a different procedure or arrangement can be applied to each cylinder in the context of this invention.

BRIEF DESCRIPTION OF THE DRAWINGS

In the following, one embodiment of the invention is further illustrated by way of drawings, where.

DETAILED DESCRIPTION

Figure 1:
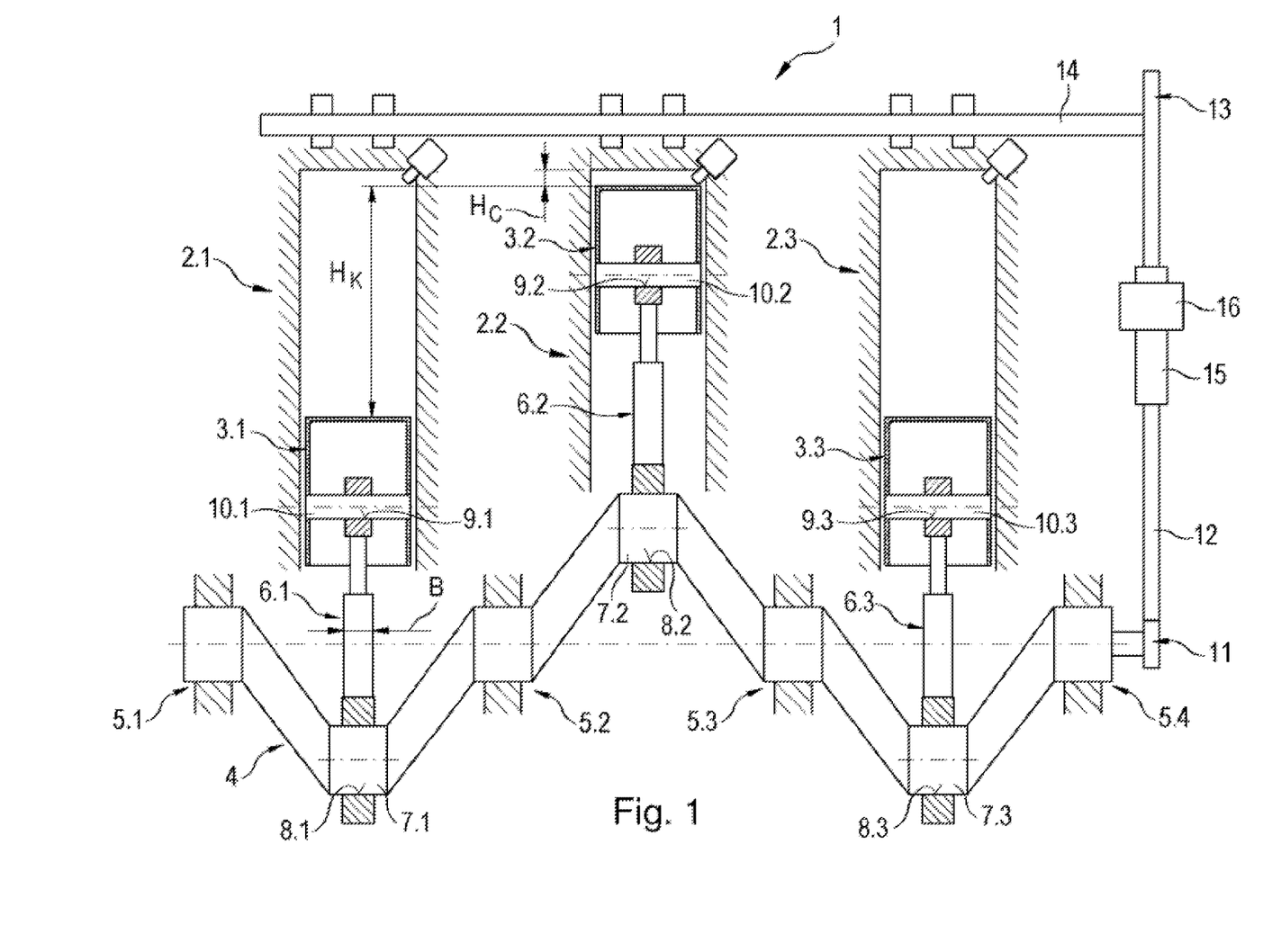
FIG. 1 shows a schematic cross-sectional view through an internal combustion engine.

FIG. 1 shows a schematic representation of an internal combustion engine (spark ignition engine) 1. Internal combustion engine 1 has three cylinders 2.1, 2.2 and 2.3, in each of which a piston 3.1, 3.2, 3.3 moves up and down. Furthermore, internal combustion engine 1 comprises a crankshaft 4 which is rotatably mounted by way of crankshaft bearings 5.1-5.4. Crankshaft 4 is connected to associated pistons 3.1, 3.2 and 3.3 by way of respective connecting rods 6.1, 6.2 and 6.3. Crankshaft 4 comprises an eccentrically arranged crankshaft journal 7.1, 7.2 and 7.3 for each connecting rod 6.1, 6.2 and 6.3. Each connecting rod large end 8.1, 8.2, and 8.3 is mounted on the associated crankshaft journal 7.1, 7.2 and 7.3 Each connecting rod small end 9.1, 9.2 and 9.3 is mounted on a piston pin 10.1, 10.2 and 10.3 and is thus pivotally connected to associated piston 3.1, 3.2 and 3.3.

Crankshaft 4 is provided with a crankshaft sprocket 11 and is coupled to a camshaft sprocket 13 by way of a timing chain 12. Camshaft sprocket 13 drives a camshaft 14 with its associated cams for operating the intake and exhaust valves (not shown in detail) of each cylinder 2.1, 2.2 and 2.3. The return span of timing chain 12 is tensioned by use of a pivotally arranged tensioning rail 15 which is pressed thereagainst with a chain tensioner 16. The drive span of timing chain 12 can slide along a guide rail. The essential mode of operation of this timing system, including fuel injection and ignition by way of a spark plug, is not explained in detail and is assumed to be known. The eccentricity of crankshaft journals 7.1, 7.2 and 7.3 substantially determines the stroke $H_K$, in particular when, as presently, crankshaft 4 is arranged exactly centrically beneath cylinders 2.1, 2.2 and 2.3. Piston 3.1 is shown in its lowermost position in FIG. 1, whereas piston 3.2 is shown in its uppermost position. The difference presently defines stroke $H_K$. The remaining height $H_C$ (see cylinder 2.2) determines the remaining compression height in cylinder 2.2. In connection with the diameter of piston 3.1, 3.2 or 3.3 or associated cylinders 2.1, 2.2 and 2.3, respectively, the displacement $V_h$ is obtained from stroke $H_K$ and the compression volume $V_c$ is calculated from the remaining compression height $H_C$. Compression volume $V_c$ is of course decisively dependent on the design of the cylinder cover. Compression ratio ε results from these volumes $V_h$ and $V_c$. ε is calculated from the sum of displacement $V_h$ and compression volume $V_c$ divided by compression volume $V_c$. Typical values today for spark ignition engines range between 10 and 14 for ε.

To enable the compression ratio ε to be adapted in dependence of the operating point (n, T, throttle position) of internal combustion engine 1, connecting rods 6.1, 6.2 and 6.3 are configured according to the invention to be adjustable in their length. As a result, e.g. a higher compression ratio can be obtained in the partial load range than in the full load range.

Figure 2:
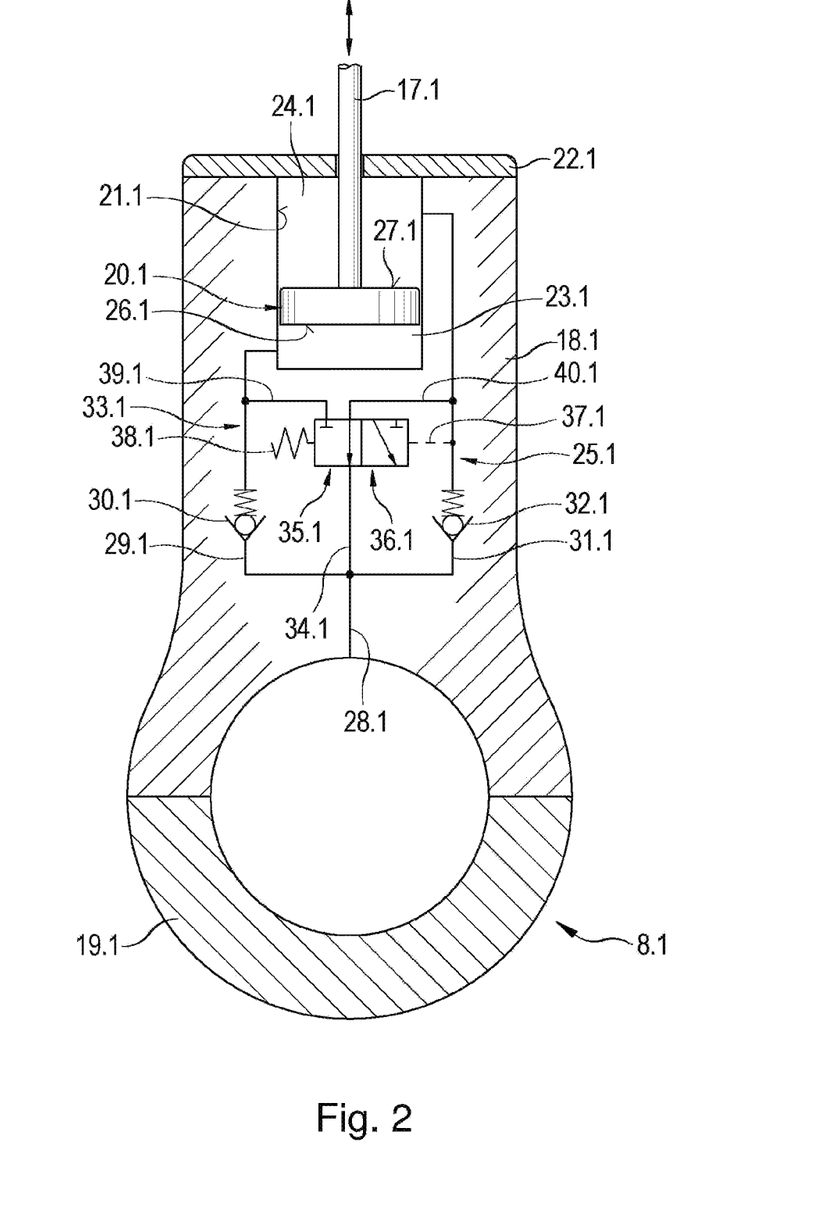
FIG. 2 shows a schematic representation of a connecting rod from FIG. 1 with a hydraulic actuation circuit.

Shown in FIG. 2 schematically and by way of example is connecting rod 6.1 which, however, is configured to be identical to connecting rods 6.2 and 6.3. The description therefore applies accordingly. The VCR connecting rod 6.1 comprises a movably arranged first rod member 17.1, at the upper end of which connecting rod small end 9.1 is arranged. Second rod member 18.1 comprises a lower bearing shell 19.1, which, together with the lower region of second rod member 18.1, surrounds said connecting rod large end 8.1. Lower bearing shell 19.1 and second connecting rod member 18.1 are connected to one another in the typical manner by way of fastening devices. The lower end of first rod member 17.1 is provided with an adjustment piston 20.1, which is guided movable in a piston bore 21.1. Second connecting rod member 18.1 comprises a cover 22.1 at the upper end through which first rod member 17.1 passes and is sealed. Cover 22.1 therefore seals cylinder bore 21.1 entirely. Adjustable piston 20.1 is configured as a stepped piston. Formed below adjustable piston 20.1 is a first pressure chamber 23.1 having a circular cross-section and formed above adjustable piston 20.1 is a circular ring-shaped second pressure chamber 24.1. Adjustable piston 20.1 and cylinder bore 21.1 are part of an adjustment mechanism for varying the connecting rod length. Part of the adjustment mechanism is also a hydraulic actuation circuit 25.1 that is to be described in more detail and which respectively provides for an inflow or outflow of the hydraulic fluid into or out of pressure chambers 23.1 and 24.1 and thus for a motion of adjustable piston 20.1 or locks the latter. As mentioned above, adjustable piston 20.1 is formed as a stepped piston. A stepped piston is generally understood to be a piston acting on two sides with acting surfaces of different sizes. A first adjustment piston side 26.1 is configured to be circular and associated with first pressure chamber 23.1. A second adjustable piston side 27.1 is configured to have the shape of a circular ring and associated with second pressure chamber 24.1. Hydraulic actuation circuit 25.1 is operated with engine oil. For this purpose, an oil supply channel 28.1 is in communication with connecting rod large end 8.1, as a result of which engine oil can be supplied to hydraulic actuation circuit 25.1 or possibly flow out from the latter. Oil supply channel 28.1 branches into different sections (partial channels). A first section 29.1 is in communication with first pressure chamber 23.1 to ensure an inflow into first pressure chamber 23.1. Additionally disposed in section 29.1 is a first check valve 30.1 which is intended to prevent the immediate outflow of the oil from first pressure chamber 23.1, but allows the inflow at any time. A second section 31.1 is in communication with second pressure chamber 24.1 to allow the inflow of oil into second pressure chamber 24.1. Disposed in second section 31.1 is a second check valve 32.1 which prevents the immediate outflow of oil from second pressure chamber 24.1, but allows the inflow at any time.

Furthermore, a control valve 33.1 having two switching positions is provided. Control valve 33.1 is in direct communication with a third section 34.1 of oil supply channel 28.1. Control valve 33.1 acts one of its two switching positions as either a return flow valve 35.1 for the outflow of hydraulic fluid from second pressure chamber 24.1 or in its second switching position as a return flow valve 36.1 for the outflow of hydraulic fluid from first pressure chamber 23.1. The respective other pressure chamber 23.1 or 24.1 is hydraulically blocked in the respective associated switching position, as a result of which first rod member 17.1 assumes either the retracted or the extended position. Control valve 33.1 is switched by way of a control line 37.1 which is in communication with second section 31.1 downstream of second check valve 32.1 and with a reset spring 38.1 which forces control valve 33.1 to the first switching position shown in FIG. 2. The second switching position is obtained by generating an increased pressure level in oil supply channel 28.1, so that control valve 33.1 is forced to the second switching position against the force of reset spring 38.1. Corresponding first and second return flow channels 39.1 and 40.1 are in communication with control valve 33.1 in the corresponding sections portions of first and second sections 29.1 and 31.1 to enable a respective outflow from first pressure chamber 23.1 and second pressure chamber 24.1.

It is to be noted that hydraulic actuation circuit 25.1 can also comprise additional elements, channels, valves, etc. or can be configured differently for providing the desired adjustment function. First and second return flow valves 35.1 and 36.1 do not necessarily have to be configured as a common control valve 33.1, but can be configured as separate units. The hydraulic circuit diagram of hydraulic actuation circuit 25.1 is therefore only representative of the mode of operation and not of the concrete configuration.

Figure 3:
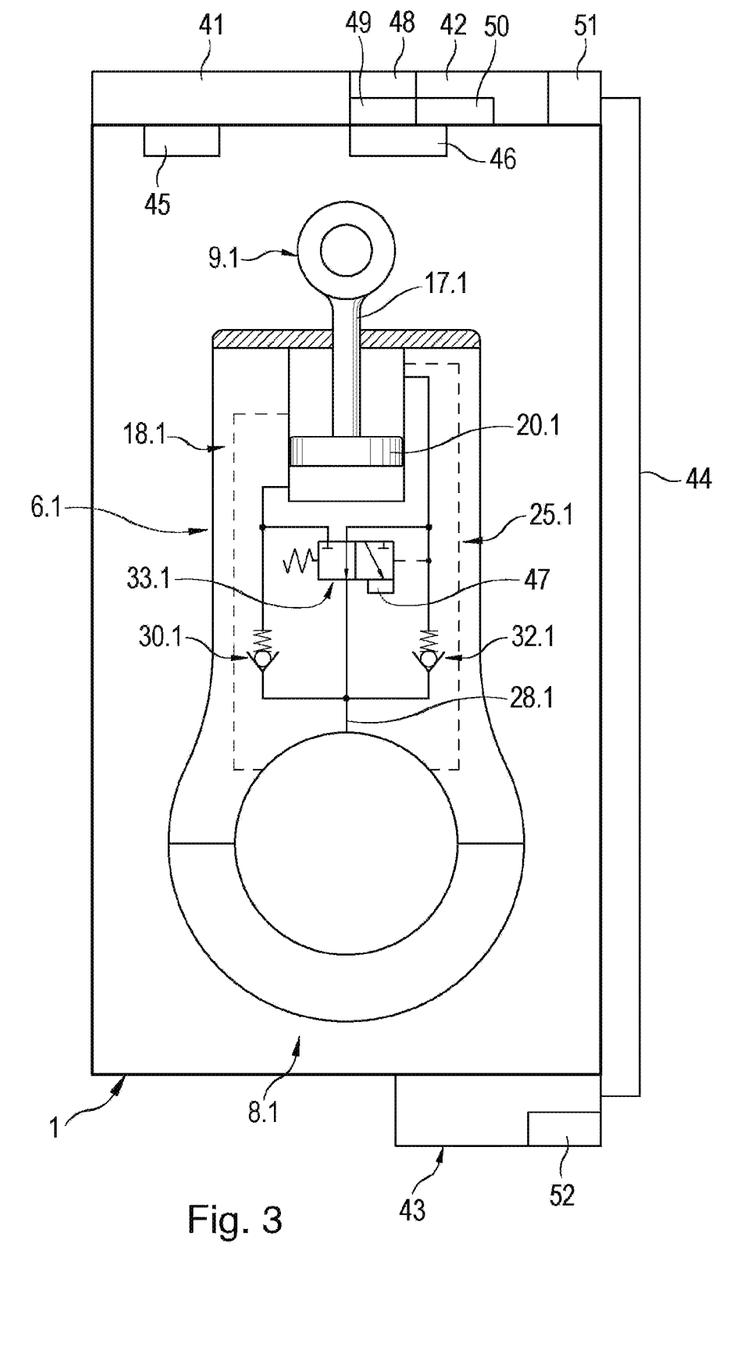
FIG. 3 shows a schematic representation of an internal combustion engine with a VCR connecting rod and a control system.

The control device for VCR connecting rod 6.1 is described in more detail below using schematic FIG. 3. The same applies for VCR connecting rods 6.2 and 6.3.

VCR connecting rod 6.1 is a component of an internal combustion engine 1 which comprises an engine control system 41 (e.g. control devices ECUs, etc.) which records multiple pieces of engine data, e.g. the actual rotational speed, the current torque and possibly other parameters, e.g. the oil pressure, etc. In the present case, engine control system 41 comprises a detection device 42 (can also be provided separately) for determining a defect of hydraulic actuation circuit 25.1 Part of combustion engine 1 is also an oil pump unit 43 which is likewise connected to engine control system 41 and detection device 42 by way of an electrical line 44. By use of oil pump unit 43 in the region of the crankshaft bearing of VCR connecting rod 6.1, the supply via oil supply channel 28.1 can be ensured and at least one first and one second pressure level can be adjusted in such a way that control valve 33.1 is switched. Modern internal combustion engines are typically already equipped with a knock sensor 45 to protect the internal combustion engine 1 from damage. Knock sensor 45 presently used can also be employed for precise determination of the switching position of VCR connecting rod 6.1. It is clearly possible with knock sensor 45 to distinguish between the first position of VCR connecting rod 6.1 and the second, shorter switching position of VCR connecting rod 6.1. However, additional sensors 46 or 47 can also be used on the internal combustion engine or directly in VCR connecting rod 6.1. Sensor 46 can be, for example, a distance sensor that detects the extended position of first rod member 17.1. Sensor 47 can detect, e.g. the switching position of control valve 33.1. Sensor 47 is preferably an autarkic sensor with its own energy source. Any sensor can be used with which a conclusion can be drawn about the switching position or a defect of a component of hydraulic actuation circuit 25.1. can be determined This detection can be done directly or indirectly.

For identifying the defective component of hydraulic actuation circuit 25.1, detection device 42 comprises a distinguishing device 48 which not only detects a defect but can specifically determine the defective component.

Furthermore, a fault management device 49 is optionally integrated into engine control system 41 as part of detection device 42. Fault management device 49 comprises a storage device 50, in which fault routines are stored which, after the detection of a defect of hydraulic actuation circuit 25.1 and possibly after the identification of the defective component of hydraulic actuation circuit 25.1, moves VCR connecting rod 6.1 to a predetermined switching position (quasi as emergency mode), or shuts down associated cylinder 2.1 or internal combustion engine 1.

Important for the detection of a fault or for the detection of a defect is a comparison between the desired target state (target position) of VCR connecting rod 6.1 and the actual position of VCR connecting rod 6.1. For this purpose, a status protocol is stored in storage device 50 and contains the necessary data for the switching position to be assumed. This is usually engine performance data which is characteristic for an switching position to be assumed. A comparison of the currently determined engine performance data and the status protocol is conducted by an evaluation device 51 integrated in detection device 42 or engine control system 41, respectively. If they match or are within predetermined limits, then the target position of VCR connecting rod 6.1 and/or the target state of a component or of components of hydraulic actuation circuit 25.1 can be determined from this. The target position thus determined of VCR connecting rod 25.1 or the target state of a component or of components of hydraulic actuation circuit 25.1 can then be compared to the actual position of VCR-Connecting rod 6.1 and/or the actual state of a component or of components of hydraulic actuation circuit 25.1 and a deviation can be determined from which a defect can be inferred.

The entire process can run in multiple stages. After determining a defect, performing a certain routine to identify the defective component of hydraulic actuation circuit 25.1. Distinguishing device 48 is configured in such a way that it performs a change in the switching position of control valve 33.1 after a defect has been determined. If, for example, control valve 33.1 is disposed in a certain switching position and a deviation has been determined, in particular, first rod member 17.1 is not in the corresponding position, then control valve 33.1 is intentionally switched to the other switching position as part of the identification process.

It can thus be determined whether there is also a defect present in this second switching position. If this is not the case, then a number of components of hydraulic actuation circuit 25.1 can already be excluded from further troubleshooting. Furthermore, it can be distinguished whether the desired target position or the desired target state cannot be obtained at all or this state cannot be assumed in a controlled manner (because the result is unpredictable or changes over time e.g. in the event of leakage).

Preferably, oil pump unit 43 also comprises a pressure sensor 52 or a sensor for determining the operating state, the outcome of which can be integrated into this routine. Once the defective component has been identified by way of this fault routine, the defect can be further categorized. As an example, first return flow valve 35.1 (RLV1), first check valve 30.1 (RSV1), second return flow valve 36.1. (RLV2) and second check valve 32.1 (RSV2) as components of hydraulic actuation circuit 25.1 are to be respectively monitored and determinable. The defect is classified in terms of flow passage through this respective valve. Either the flow is blocked; there is therefore no flow, or the flow is uncontrolled; therefore does not lead to the predetermined result or changes over time, e.g. due to leakage, without the switching position for operating hydraulic actuation circuit 25.1 having changed.

Figure 4:
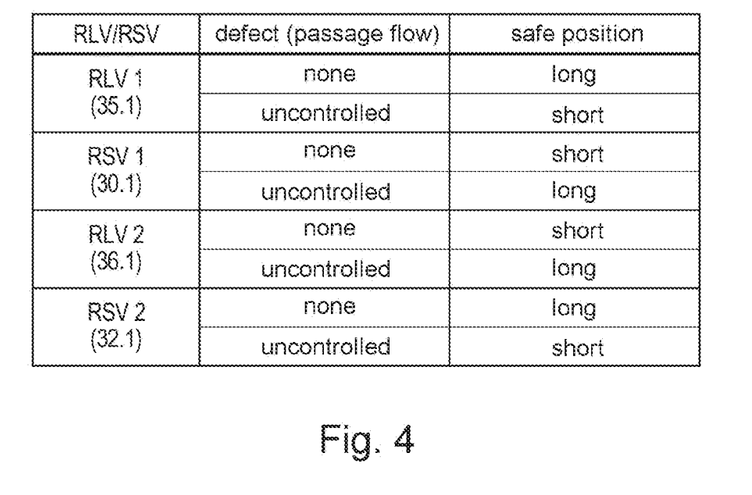
FIG. 4 shows an association table with regard to a defect and a safe position.

FIG. 4 shows a table that deals with the appearance of a defect of only one of these components. Depending on the defect determined, VCR connecting rod 6.1 is to be moved to a safe position (stable position). A safe position is advantageous because shutting down associated cylinder 2.1 or internal combustion engine 1 is then not absolutely necessary. A trip to the workshop is then still possible. The short position of VCR connecting rod 6.1 is actually preferable because this at most worsens the exhaust emissions values, but further protective measures to be initiated in order to avoid damage to cylinder 2.1 or internal combustion engine 1 are not necessary. The associated vehicle typically has an optical and/or acoustic fault indicator which indicates a defect or the specific defect and suggests that a workshop should be visited. Detection device 42 generates a specific control signal for defect-dependent actuation of hydraulic actuation circuit 25.1 according to the specifications of the table in FIG. 4 and generates a defect indication signal to effect the optical and/or acoustic fault display.

Figure 5:
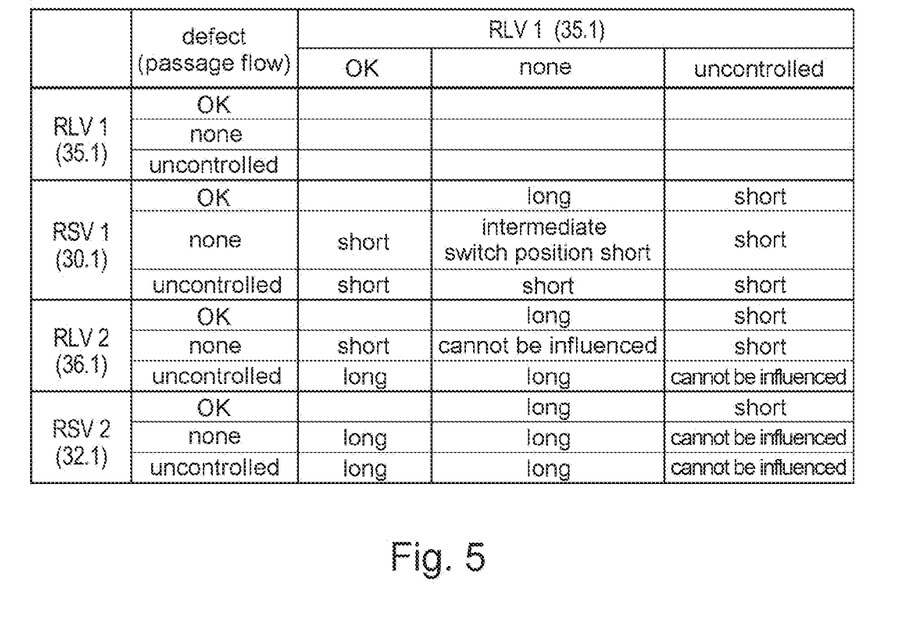
FIG. 5 shows an association table similar to FIG. 4 for the occurrence of multiple defects.

Theoretically, failure of several components of hydraulic actuation circuit 25.1 simultaneously can also occur. The table in FIG. 5 shows roughly how to deal with respective defects. In that actuation circuit 25.1 of VCR connecting rod 6.1 is moved to a stable position. This is illustrated in the table of FIG. 5 using a defect of first return flow valve 35.1 and one of the three other components of hydraulic actuation circuit 25.1. In addition, it can also be determined for all other defect combinations whether a safe position is possible. It can also be recognized from the table that, for example, in the case of a defect of first return valve 35.1, in which there is no flow present through it, and in the case of a defect of first check valve 30.1, in which there is also no flow present, a complete defect is given ("cannot be influenced") which leads to the shutdown of associated cylinder 2.1 or to the shutdown of internal combustion engine 1. If the long position of VCR connecting rod 6.1 is selected as a safe position, then the performance of internal combustion engine 1 or cylinder 2.1 must also be throttled, so that no knocking of associated cylinder 2.1 or of internal combustion engine 1 arises, which can cause component destruction. Lowering to a predetermined lower performance level is then stored accordingly in engine control system 41.

In the preceding explanations, an embodiment of the device and of the method of the invention was explained in more detail on the basis of VCR connecting rod 6.1. Of course, the invention can be applied to any VCR connecting rod of internal combustion engine 1. The position of VCR connecting rod 6.1, 6.2 and 6.3 is generally adjusted in dependence of the rotational speed and load torque of internal combustion engine 1. In the simplest case, the same position is specified for all VCR connecting rods 6.1, 6.2 and 6.3 in all cylinders 2.1, 2.2 or 2.3. However, switching strategies, according to which VCR connecting rod 6.1, 6.2 or 6.3 sets a proprietary compression ratio for each individual cylinder 2.1, 2.2 or 2.3, are also conceivable. Accordingly, the behavior of the engine control system and the associated components for actuating the hydraulic actuation circuit as well as the determination of a defect and the execution of fault routines can then be customized for each VCR connecting rod 6.1, 6.2 or 6.3 With the present invention, faulty behavior of VCR connecting rods 6.1, 6.2, 6.3 and associated hydraulic actuation circuit 25.1 is detected by way of electronic control system devices and, possibly, sensor technology and measures that are to prevent engine damage are immediately taken. In the simplest form, the defect of a component of hydraulic actuation circuit 25.1 is to be detected by way of the position of first rod member 17.1, where the current target state is compared to the actual state.

For this purpose, the desired position of VCR connecting rod 6.1, 6.2 or 6.3 must first be known. For that purpose, the actual rotational speed, the current torque and optionally other parameters defining the target position of VCR connecting rod 6.1, 6.2 or 6.3 (e.g. oil pressure) are compared in engine control system 41, or a device with comparable information and capabilities, to a stored status protocol for VCR-connecting rod 6.1, 6.2 or 6.3. This delivers the target position of VCR connecting rod 6.1, 6.2 or 6.3. The actual position of VCR connecting rod 6.1, 6.2 or 6.3 can now be detected by use of a suitable sensor system in the engine compartment. However, it is also conceivable that distance or status sensors are installed directly in VCR connecting rod 6.1, 6.2 or 6.3, or that conclusions are drawn about the actual position of VCR connecting rod 6.1, 6.2 or 6.3 only by evaluation of the engine performance data, without additional sensors.

If it is now determined that the target position is not reached over several combustion cycles, it can then be concluded that a defect in VCR connecting rod 6.1, 6.2 or 6.3 that is related to the valves of associated pressure chamber 23.1 or 24.1 has occurred.

In such a case, the default target position of VCR connecting rod 6.1, 6.2 or 6.3 can be changed via engine control system 41, so that VCR-connecting rod 6.1, 6.2 or 6.3 assumes a different position. In the telescopic system presently described, VCR connecting rod 6.1 would be switched by adjusting the control pressure level from the short to the long position or vice versa by use of oil pump unit 43.

In the event of a deviation, the faulty component should be identified, a preferred operating state should be assumed and a signal delivered to the driver.

In order to determine where the defect is present, the position of control valve 33.1 must be changed, e.g. hydraulically (changing the pressure level at the connecting rod large end 8.1) or mechanically. This allows the defective position to be determined by following the exclusion principle. VCR connecting rod 6.1, 6.2 or 6.3 is subsequently to be moved to a stable position, where the position "short" is to be preferred, since engine damage can be excluded in this position and only the exhaust emissions values are temporarily not complied with. A trip to the workshop is possible.

Should only the position "long" be possible, then performance must be limited immediately, otherwise engine damage due to knocking is imminent at a high rotational speed. A trip to the workshop is possible thereafter.

Should a defect ("cannot be influenced") be present in more than one location, then the driving operation is to be stopped immediately.

In any case, the driver must be informed of the defect by a suitable signal.

In the present embodiment, a whole series of devices (e.g. detection device 42, distinguishing device 48, fault management device 49, storage device 50, as well as evaluation device 51 are integrated as components into engine control system 41). In some cases, they are also only stored or programmed as program sequences within engine control system 41. Of course, it is also possible to locate some of the devices or all devices separately from engine control system 41. Such apparatuses can also be associated with each VCR connecting rod 6.1,6.2 or 6.3 or they may be respectively associated centrally as being responsible for some or all VCR connecting rods 6.1, 6.2 or 6.3

LIST OF REFERENCE NUMERALS

1 combustion engine
2.1, 2.2, 2.3 cylinder
3.1, 3.2, 3.3 piston
4 crankshaft
5.1, 5.2, 5.3, 5.4 crankshaft bearing
6.1, 6.2, 6.3 connecting rod
7.1, 7.2, 73 crankshaft journal
8.1, 8.2, 8.3 connecting rod large end
9.1, 9.2, 9.3 connecting rod small end
10.1, 10.2, 10.3 piston pin
11 crankshaft sprocket
12 timing chain
13 camshaft sprocket
14 camshaft
15 tensioning rail 16 chain tensioner
17.1 first rod member
18.1 second rod member
19.1 lower bearing shell
20.1 adjustable piston
21.1 piston bore
22.1 cover
23.1 first pressure chamber
24.1 second pressure chamber
25 hydraulic actuation circuit
26.1 first adjustable piston side
27.1 second adjustable piston side
28.1 oil supply channel
29.1 first section
30.1 first check valve
31.1 second section
32.1 second check valve
33.1 control valve
34.1 third section
35.1 first return flow valve
36.1 second return flow valve
37.1 control line
38.1 return spring
39.1 first return flow channel
40.1 second return flow channel
41 engine control system
42 detection device
43 oil pump unit
44 line
45 knock sensor
46 sensor
47 sensor
48 distinguishing device
49 fault management device
50 storage device
51 evaluation device
52 pressure sensor

The invention claimed is:

1. A method for operating an actuation circuit of a VCR connecting rod of an internal combustion engine comprising the steps of:
determining a defect of said actuation circuit by use of a detection device and generating a predetermined control signal for triggering a least one of the following actions: a defect-dependent actuation of said actuation circuit, a shutdown of said internal combustion engine and generating a defect display signal in order to deliver an optical and/or acoustic fault display, and wherein a target position of said VCR connecting rod is determined by a comparison of status data of said VCR connecting rod to correspondingly stored status data, where an actual position of said VCR connecting rod is determined directly, and/or a target position of said VCR connecting rod is determined by a comparison of status data of said internal combustion engine to correspondingly stored status data, where an actual position of said VCR connecting rod is determined indirectly, wherein a defect can be determined by comparing the target position to an actual position, and wherein said actuation circuit comprises a first return flow valve, a first check valve, a second return flow valve, and a second check valve as components, where said actuation circuit upon determining a defect of one of these components lets said VCR connecting rod move to the stable position according to the following fault routine:

| RLV/RSV | defect | stable position |
| --- | --- | --- |
| RLV 1 | None flow | long |
|  | Uncontrolled state | short |
| RSV 1 | None flow | short |
|  | Uncontrolled state | long |
| RLV2 | None flow | short |
|  | Uncontrolled state | long |
| RSV 2 | None flow | long |
|  | Uncontrolled state | short. |

2. The method according to claim 1, wherein the status data of said VCR connecting rod determined for determining the target position comprises at least one of the oil pressure at the connecting rod large end, a state of actuation of the associated oil pump, and the determined status data of said combustion engine including a rotational speed and/or a torque.

3. The method according to claim 1, wherein a sensor device present on said internal combustion engine, in particular a knock sensor, and/or the sensor device on said VCR connecting rod is used to determine the actual position of said VCR connecting rod.

4. The method according to claim 1, wherein after determining a defect by operating said actuation circuit, said VCR connecting rod is moved to a stable position corresponding to a short position of said VCR connecting rod.

5. The method according to claim 1, wherein when said VCR connecting rod is moved to a stable position corresponding to a long position of said VCR connecting rod, then the available performance of said internal combustion engine is lowered to a predetermined lower level.

6. The method according to claim 1, wherein said actuation circuit comprises a control valve and a defective component or defective components of said actuation circuit is/are determined by switching said control valve.

* * * * *